United States Patent
Suzuki et al.

[15] 3,678,014
[45] July 18, 1972

[54] LOW TEMPERATURE PEROXIDE CURABLE THERMOSETTING POLYURETHANE RESIN HAVING TERMINAL UNSATURATION

[72] Inventors: Hisao Suzuki, Fujisawa-shi; Akira Musashi, Kanagawa-ken; Makoto Hiruta, Kanagawa-ken; Hiroo Muramoto, Kanagawa-ken, all of Japan

[73] Assignee: Nippon Soda Co., Ltd., Tokyo, Japan

[22] Filed: Aug. 7, 1969

[21] Appl. No.: 849,298

[52] U.S. Cl............260/77.5 CR, 260/77.5 CH, 260/94.7 N, 260/859
[51] Int. Cl.......................................................C08g 22/00
[58] Field of Search..............260/77.5 CR, 77.5 CH, 94.7 N, 260/859 R

[56] References Cited

UNITED STATES PATENTS

| | | | |
|---|---|---|---|
| 2,808,391 | 10/1957 | Pattison | 260/453 |
| 2,877,212 | 3/1959 | Seligman | 260/77.5 |
| 2,958,704 | 11/1960 | Dinbergs et al. | 260/77.5 |
| 3,135,708 | 6/1964 | Muller et al. | 260/859 |
| 3,404,130 | 10/1968 | Sigura et al. | 260/77.5 |
| 3,427,366 | 2/1969 | Verdol et al. | 260/77.5 |
| 3,431,235 | 3/1969 | Lubowitz | 260/47 |
| 3,509,234 | 4/1970 | Burlant et al. | 260/859 |

OTHER PUBLICATIONS

The Chemistry of Organic Film Formers, Solomon John Wiley and Sons, N.Y. 1967 pp. 50–54.

*Primary Examiner*—Donald E. Czaja
*Assistant Examiner*—Eugene C. Rzucidlo
*Attorney*—George B. Oujevolk

[57] ABSTRACT

A thermosetting resin having the formula:

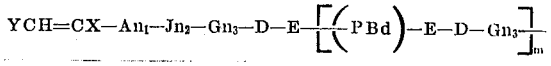

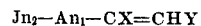

wherein X is hydrogen, or an alkyl radical containing up to four carbon atoms; Y is selected from the group consisting of hydrogen, phenyl, and alkoxycarbonyl; A is a carboxyl, or a carbonyl group; J is an alkylene group containing less than five carbon atoms and G is selected from the group consisting of urethane, carboimino and ureylene group; E is urethane or carboimino, and can be the same or different from G; D is selected from the group consisting of alkylene, cycloalkylene, phenylene, naphthylene, pyrene, bis(phenylene)-methylene and a tris(phenylene)methylidyne radical (in which the radical may be substituted by a lower alkyl radical); PBd is a polybutadiene or copolybutadiene chain having a polymerization degree of from 4 to 370 and from about 50 percent to about 100 percent of 1,2-configuration; $n_1$, $n_2$, and $n_3$ express 0 or 1 respectively, wherein a combination of (1) $n_1=1$, $n_2=1$, and $n_3=0$, and (2) $n_1=1$, $n_2=0$ and $n_3=0$ does not occur; and $m$ expresses an integer of 1 to 3.

20 Claims, No Drawings

LOW TEMPERATURE PEROXIDE CURABLE THERMOSETTING POLYURETHANE RESIN HAVING TERMINAL UNSATURATION

DETAILED EXPLANATION OF THE INVENTION:

This invention relates to novel curable resin and compositions thereof and more particularly is concerned with a novel curable resin characterized by having polybutadiene as a main chain, an olefinic bond in the tips of the molecule and urethane or a carboimino group which combines the polybutadiene chain with segments containing the olefinic bond. This invention also relates to the process for the production of the aforementioned resin.

It is well known that a linear polymer or copolymer of butadiene having a molecular weight of 500–20,000 is cured by heating together with an organic peroxide compound to produce a thermosetting resin, a coating film and an adhesive. However, in order to gain a sufficiently cured product, high temperature and a long period of time, for example 200° C or higher for from several hours to a day or longer are required. Thus, a low efficiency for the baking apparatus, or difficulty of mass production, results in a high cost for the cured product. In U.S. Pat. No. 3,083,175, Safford et al. describe how polybutadiene can be cured with di-α-cumyl peroxide within a short period of time. But the principal drawbacks are the physical properties of the product, such as being poor in impact resistance, crack resistance and adhesion properties are not yet solved. Netherlands Patent No. 6700705 and corresponding U.S. Pat. No. 3,431,235 discloses that the reaction product between a polybutadiene having a plural number of functional groups such as hydroxyl group and a chain extender such as organic diisocyanate compounds is cyclized by an organic peroxide compound and produces a hard or an elastomeric resin. Although this resin possesses high strength, chemical resistance and crack resistance, the thermal stability and curing rate are not always satisfactory. For example, a curing period of several days at 150° C is necessary so it is difficult to apply this method to sensitive electronic parts.

One of the objects of the present invention is to provide a resin which is capable of being cured at a relatively low temperature within a short period of time having good flexibility, mechanical strength and crack resistance.

Another object of the invention is to provide a coating material and an adhesive having the aforementioned properties. It is another object of the invention to provide a method for producing a resin, which is suitable for the thermosetting resin, including the coating material and the adhesive. A further object of the invention is to provide compositions which are suitable for hard resins, coatings or adhesives.

We have discovered that a resin having a polybutadiene chain, an olefinic bond group in the tips of the molecule and urethane or carboimino group which combines the polybutadiene chain with the segments containing the olefinic bond can be cured in the presence of an organic peroxide compound at a relatively low temperature within a very short period of time, and the cured resin has good flexibility, mechanical strength and crack resistance. The resin of the present invention is represented by the following formula:

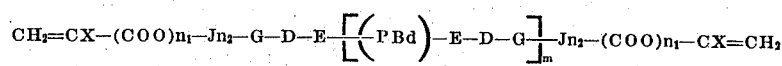

(1)

wherein X is hydrogen or methyl radical; J is ethylene or propylene and G and E are urethane or carboimino and can be the same or different from G; D is selected from the group consisting of alkylene, cycloalkylene, phenylene, naphthylene, bis(phenylene)-methylene radical (in which the radical may be substituted by a lower alkyl radical); PBd is a polybutadiene or copolybutadiene chain having a polymerization degree of from 4 to 370 and from about 50 percent to about 100 percent of 1,2-configuration: $n_1$ and $n_2$ express 0 or 1 provided that when G is urethane, $n_1$ and $n_2$ are both 1 and when G is carboimino, $n_1$ and $n_2$ are both 0, and $m$ expresses an integer of 1 to 3.

In general, 1,3-butadiene can enter into a polymer chain by either 1,2- or 1,4-mode of addition; the 1,2-mode of addition results in the following "pendant vinyl" structure

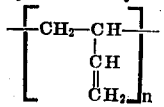

(hereinafter called "1,2-configuration polybutadiene") whereas 1,4-mode of addition results in the following structure:

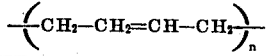

(hereafter called "1,4-configuration polybutadiene").

A mode of addition depends on the type of catalysts and conditions used for the polymerization. As the unsaturated bond in the pendant vinyl structure, cooperating with the olefinic bond groups in the tip segments, shows high activity in comparison with internal olefinic structure, 1,2-configuration polybutadiene gives a hard polymer within a relatively short period of time. Consequently, it is necessary in this invention to use polybutadiene having a higher content of the 1,2-configuration structure; i.e., at least 30 percent, preferably over 50 percent and more preferably over 80 percent. Particularly, in case of over 80 percent, the resins of this invention can be cured at a low temperature below 120° C and within a 30-minute period of time. Therefore, the resin of the present invention is characterized by consisting a polybutadiene chain having many pendant vinyl group, and in which the polybutadiene chain is combined with the segment containing an olefinic bond group through a urethane or carboimino group. The olefinic bond group cooperating with the pendant vinyl group seems to promote the counter-molecular link reaction and the urethane or carboimino group seems to give flexibility and shock resistance.

The polybutadiene chain may contain other kinds of comonomer residues not more than 50 weight percent of the total polymer and it is called copolybutadiene hereinafter. Comonomers which can be used for producing copolybutadiene are styrene, α-methyl styrene, isoprene, methyl acrylate, ethylacrylate, methyl methacrylate and ethyl methacrylate and they are employed with butadiene as random, block or graft copolymer.

The polybutadiene or copolybutadiene used for the present invention is also required to have substantially two functional groups which may form chemical bond E in the Formula (1) as the result of reaction with isocyanate radical. Such electrophilic functional groups as hydroxyl, carboxyl and amino are typical examples.

The polybutadiene and copolybutadiene is produced by conventional processes using a catalyst system such as an alkali metal catalyst in the non-polar hydrocarbon solvent, an alkyl, aryl or aralkyl lithium catalyst in the non-polar hydrocarbon solvent, a coordinated anionic catalyst, and an alkali metal catalyst in a Lewis base solvent. The alkali metals used are lithium, sodium, potassium, rubidium and cesium; the alkyl, aryl or aralkyl lithium catalyst is, for example, ethyl, propyl, butyl, amyl, phenyl or cumyl lithium; and typical examples of the coordinated anionic catalysts are triethylaluminum - triacetylaceto vanadium, triethylaluminium-triacetylaceto chromium and triethyl aluminum-tetrabutyl titanium. However, favorable polybutadienes are, for instance, produced as follows; in the presence of an aromatic hydrocarbon activator such as naphthalene or 1,2-diphenyl-benzene, butadiene or a mixture of butadiene and diluent, is introduced a Lewis base which contains a dispersed alkali metal such as lithium, sodium, potassium, rubidium or cesium and polymerized under chilling below −30° C and agitation. Mixing the resulting reaction mixture with an electrophilic agent such as carbon dioxide, alkylene oxide having less than five carbon atoms or ethylene sulfide followed by treating with proton-donor reagent such as water, alcohols or carboxylic acids, polybutadiene having the electrophilic functional groups substantially on both ends of the polymer chain is carried out. If butadiene and any of the aforementioned comonomers are added simultaneously, alternatively or successively into the Lewis base containing a dispersed alkali metal, and the resulting reaction mixture is treated with an electrophilic reagent and proton-donor reagent, copolybutadiene having the functional groups is obtained. This polymerization reaction can also be carried out in the absence of the aromatic hydrocarbon activator when the dispersed alkali metal is fine enough so that the average diameter is less than 5 $\mu$. The aromatic hydrocarbon activator used for this reaction is a condensed ring aromatic hydrocarbons such as anthracene, naphthalene and phenanthrene; non-condensed ring aromatic hydrocarbons such as biphenyls and terphenyls; polynuclear condensed ring aromatic compounds such as binaphthyls and phenyl naphthalene; conjugated unsaturated hetero cylcic compounds substituted with a vinyl group such as $\alpha$-vinyl pyridine and vinyl furan; or diaryl ketone such as benzophenone and phenyl naphthyl ketone. The Lewis base used for this reaction is ethers such as dimethyl ether, methyl ethyl ether, 1,2-dimethoxy ethane, 2,2'-dimethoxy dimethyl ether, tetrahydro furan and 1,4-dioxane; acetals such as methylal and 1,1-dimethoxy ethane; and tertiary amines such as trimethyl amine, triethylamine and N-methyl morpholine. Thus, the polybutadiene or copolybutadiene obtained by the above procedure has more than 80 percent of 1,2-configuration, extremely narrow distribution of molecular weight and substantially a functional group on each end of the polymer chain, and consequently it is particularly favorable for a raw material of the present invention.

A polybutadiene having the functional groups is also derived from polybutadiene not having the functional group by reacting with an active monomer containing at least one functional group. Acrylic acid, methacrylic acid, maleic acid, maleic anhydride, fumaric acid and esters thereof are examples used for the active monomer. Reaction between the polybutadiene and the active monomer takes place by mixing together and keeping at an elevated temperature with agitation in the presence of a catalyst, a gelling inhibitor and diluent if desired. During the reaction period, the active monomer seems to add onto the $\alpha$-position carbon of unsaturated C—C bond of the polybutadiene and thus the functional group is introduced. In general, molar ratio of an active monomer to the polybutadiene should be controlled to be not over 2. Relatively lower molecular weight polybutadiene is applied for this addition reaction and the molecular weight of less than 2,000 is preferable. Polybutadiene or copolybutadiene may be modified by grafting other monomers including styrene, $\alpha$-methylstyrene, alkyl methacrylates and acryl nitril.

When the olefinic bond group in the tip segment of this resin is combined directly with an electrophylic group such as carboxyl or oxycarbonyl, the olefinic bond group is so activated that the resin is curable within a short period of time at low temperature in the presence of organic peroxide compound. For example, it is possible to cure at 100° C for from 10 minutes to 1 hr.

This is very significant when the resin is applied to the electronic part which is highly sensitive to heat.

The process for the preparation of the resin of the present invention is carried out by a reaction between the polybutadiene or copolybutadiene having the functional groups, which contain an active hydrogen component, in each end of the polymer chain and an isocyanate compound having an olefinic bond group. The quantity of the isocyanate compound is such that the ratio of the isocyanate group to the active hydrogen component of the functional group of the polybutadiene is not less than 0.5 and preferably from 0.8 to 1.2. The reaction is carried out at an elevated temperature between 50° and 150° C for from 0.5 to 10 hrs in the presence of a promotor and diluent if desired. When the ratio is less than 0.5, the resulting product fails to attain the expected object of this invention because of insufficient introduction of the urethane and olefinic bond group and, on the other hand, when the ratio is much too high, the resulting product contains a free isocyanate group and tends to increase viscosity or to solidify by reacting with moisture. The diluent employed in the reaction is selected from organic solvents, being inert to the isocyanate group, such as benzene, toluene, xylene, hexane, chlorobenzene, carbon tetrachloride, chloroform, trichloroethylene, tetrachloroethylene, etc. and catalysts used for the urethane reaction, for example tertiary amines or organic tins, are applied as the reaction promotor.

Preferable isocyanate compounds having an olefinic bond group are prepared by the reaction between an olefinic compound having at least one functional group which contains an active hydrogen atom such as hydroxyl or carboxyl group, and polyisocyanate compounds.

Typical examples of the olefinic compounds which may be employ-ed in the above reaction are: olefinic acids, e.g., acrylic acid, methacrylic acid, hydroxyalkyl acrylates, e.g., 2-hydroxyethyl acrylate, 2-hydroxypropyl acrylate, 2-hydroxybutyl acrylate, $\omega$-hydroxybutyl acrylate and p-hydroxyphenyl acrylate; hydroxyalkyl methacrylates, e.g., 2-hydroxyethyl methacrylate, 2-hydroxypropyl methacrylate, 2-hydroxybutyl methacrylate, $\omega$-hydroxybutyl methacrylate and p-hydroxyphenyl. Among these olefinic compounds, hydroxyalkyl acrylates and hydroxyalkyl methacrylates are particularly favorable because the olefinic bond group, which is close to the electrophilic group and has a moderate distance from urethane bond, is extremely activated and consequently it is possible to cure the resultant resin within a short period of time at a relatively low temperature.

Suitable polyisocyanate compounds which may be employed the reaction with the above olefinic compounds include the following: aliphatic polyisocyanates, e.g., hexamethylene diisocyanate, pentamethylene diisocyanate, butylene diisocyanate, propylene diisocyanate and ethylidene diisocyanate: aromatic polyisocyanates, e.g., 2,4-toluylene diisocyanate, 2,6-toluylene diisocyanate, 1,4-benzene diisocyanate, diphenylmethane-4,4'-diisocyanate, 1-chlorobenzene-2,4-diisocyanate, dimethylbenzene diisocyanate, naphthylene diisocyanate, triphenylmethane triisocyanate, pyrene diisocyanate and xylylene diisocyanate; and alicyclic polyisocyanates, e.g., cyclopentylene diisocyanate and cyclohexylene diisocyanate. These polyisocyanate compounds must be employed in an excess quantity stoichiometrical amount and, in other words, the reaction is carried out so as to maintain a ratio of the polyisocyanate group to the olefinic compound as not less than 1.1 and preferably between 1.5 and 2.5.

The resin of the present invention is also prepared by another process in which the said olefinic compound reacts with the isocyanate prepolymer which is obtained by the reaction between polybutadiene a functional group and an excess quantity for the stoichiometrical amount of the polyisocyanate compound.

In this case, a ratio of a isocyanate group of polyisocyanate compound to a functional group of polybutadiene is settled to more than 1.1 and preferably 1.6–2.4.

When the ratio is settled to about 2, polybutadiene having isocyanato group on each polymeric chain is obtained and consequently, the resulting product produced by the reaction with olefinic compounds having active hydrogen and represented as ($m$) is approximately 1 in the Formula (1).

When the ratio is lower than 2, chain extension takes place, urethane prepolymer having an isocyanate group is obtained and consequently ($m$) in the formula becomes more than 1. The polyisocyanate compounds and the olefinic compounds exemplified in the former process are all available to this process.

One of merits of this process is that a relatively low molecular weight polybutadiene may be applicable. If the aforementioned ratio is lower than 2, a chain extension reaction takes place and the resulting resin is rich in the urethane group and the cured resin has enough flexibility and shock resistance. Another merit of the process is the relatively little generation of heat of reaction and consequently the reaction is easily controllable.

A composition for the thermosetting resin of the present invention comprises 20–98 percent of the resin represented in the Formula (I), 0–70 percent of vinyl compound, 0.1–10 percent of an organic peroxide compound, 0.001–1 percent of a curing promotor and a balance of the other kind of thermosetting resin and filler if desired.

The resin used for the thermosetting resin composition is made of polybutadiene having an average number molecular weight of 200 to 20,000, preferably 500 to 5,000 and preferably more than 80 percent of 1,2-configuration.

The resin derived from the above polybutadiene and hydroxyalkyl acrylate or hydroxyalkyl methacrylate, is curable at a relatively lower temperature within a short period of time such as 120° C, 10 minutes or 150° C, 5 minutes and therefore it is particularly favorable among the resins of the invention.

Vinyl compounds which may be employed in the thermosetting resin composition include styrene, α-methylstyrene, vinyl toluene, propylacrylate, ethylacrylate, methylacrylate, propyl methacrylate, ethyl methacrylate, methyl methacrylate, diethyl fumarate, dimethyl fumarate, diethyl maleate, dimethyl maleate and diallyl phthalate and they are selected depending on an usage of a cured resin. For example, if mechanical strength is required, aromatic vinyl compounds, acrylates or methacrylates are employed, if electrical properties are important, aromatic vinyl compounds of diallyl phthalate are employed and if rapid curing is necessary, acrylic acids, methacrylic acid, acrylates or methacrylates are used.

Organic peroxide compounds which may be employed in the thermosetting resin composition include: diacyl peroxides, e.g., benzoyl peroxide, 2,4-dichlorobenzoyl peroxide, octanoyl peroxide, lauloyl peroxide; dialkyl peroxides, e.g., di-tert-butyl peroxide, dicumyl peroxide; alkyl peresters, e.g., tert-butyl perbenzoate, tert-butyl peracetate, di-tert-butyl perphthalate, 2,5-dimethyl-2,5-di(benzoyl peroxy)hexane; ketone peroxides, e.g., methyl ethyl ketone peroxide, cyclohexanone peroxide; and hydroperoxides, e.g., tert-butyl hydroperoxide, cumen hydroperoxide, α-phenyl ethyl hydroperoxide, cyclohexenyl hydroperoxide.

Curing promotors of this composition include metal salts of octyl acid, stearic acid, oleic acid, linoleic acid, naphthenic acid and rosin acid and said metal is selected from the group consisting or chromium, iron, cobalt, nickel, manganese and lead, and typical fillers are powder or particles of polyethylene, polybutadiene rubber, wooden dust, cellulose, plasticizer, talc, kaoline, asbest, silica, glass fiber and calcium carbonate.

Furthermore, as one of the embodiments of this invention, unless it is contrary to the expected object, other polymers may be added to the thermosetting resin composition and one example of another polymer is unsaturated polyester or alkyd resin.

A composition for the coating material of the present invention comprises 10–95 percent of the thermosetting resin represented in the Formula (I), 0.1–10 percent of an organic peroxide compound, 0.001–1.0 percent of curing promotor, an adequate quantity of an organic solvent and other thermosetting resin and the balance of a pigment, a filler and additives if desired.

The thermosetting resin used for the coating material is prepared from polybutadiene having an average number molecular weight of 500 to 5,000, preferably 1,000 to 3,000 and preferably more than 80 percent of 1,2-configuration. The organic peroxide compound, the curing promoter and the other thermosetting resin described in the thermosetting resin composition are all available in the coating material composition. Organic solvents which may be employed to the coating material composition include aliphatic hydrocarbons, e.g., naphtha, kerosene and mineral spirits; aromatic hydrocarbons, e.g., benzene, toluene, xylene and a solvent sold under the trade name of Solvesso, alcohols, e.g., butanol, propanol and methyl isobutyl carbinol; esters, e.g., ethyl acetate and butyl acetate; ketones, e.g., methyl ethyl ketone, methyl isobutyl ketone and cyclohexanone; ethers, e.g., ethyleneglycol ethyl ether and ethyleneglycol butyl ether; and hydrocarbon halogenides, e.g., carbon tetrachloride, trichloroethylene, monochlorobenzene and tetra chloroethylene. Pigment used for this composition includes titanium white, zinc oxide, white lead, red lead, chrome yellow, ultramarine, iron blue, red iron oxide, cobalt oxide, chromium oxide and carbon black.

A coating film obtained from the coating material composition of the present invention is curable at a temperature lower than 120° C and may be dried even at room temperature when the combination of alkyl peresters as a peroxide compound, with a heavy metal salts of organocarboxylic acid as a promotor is employed.

The resulting dried film has excellent properties, e.g., a sufficient hardness, a high impact resistance, a moderate flexibility, a superior adhesion and a beautiful glassy surface, and is suitable for a surface coating of a vehicular body, an electrical part or a protective coating for a chemical vessel.

A composition for the adhesive of the present invention comprises 20–90 percent of the thermosetting resin represented in the Formula (I), 10–20 percent of a vinyl compound, 0.1–10 percent of an organic peroxide compound, 0.001–1 percent of curing promoter, an adequate quantity of filler and solvent if necessary, and is available for bonding of wood, metals, glass, rubber and plastics.

The thermosetting resin used for the adhesive is prepared from polybutadiene having an average molecular weight of 1,000 to 20,000, preferably 2,000 to 10,000, and an organic peroxide compound, a curing promotor and a filler which are described in the thermosetting resin composition and a solvent described in the coating material composition are all applicable to the adhesive.

Because of the presence of the olefinic bond group joined through urethane or carboimino group in the resin, cross-linking reaction takes place very rapidly, and the adhesive of the present invention cures quickly. Further, it seems that a network structure made from active pendant vinyl groups in the polybutadiene chain results on a strong bond layer and a polar groups in the resin give the moderate flexibility and stickiness to the surfaces of the bonded material.

The effects of the present invention will be shown in the following Examples. All quantities described in this specification and the appended claims as "parts" or "percent" refer to "parts by weight" or "percent by weight" unless expressly stated otherwise.

EXAMPLE 1

Butadiene was added into tetrahydrofuran containing a dispersed metallic sodium and 1,2-diphenyl benzene at −75° C, and polymerized under vigorous agitation. The reaction mixture was treated with ethylene oxide and then hydrolyzed and thus polybutadienediol (A–1) having a number average molecular weight, determined by a vapor pressure osmometer, of 1,830, hydroxyl value of 49.5, 92.1 percent of 1,2-configuration, 7.9 percent of trans-1,4-configuration, viscosity of 10,900 centipoise at 45° C was obtained.

On the other hand, 260 parts of 2-hydroxyethyl methacrylate was allowed to react with 348 parts of a commercial toluylene diisocyanate composed of 80 percent of 2,4-toluylene diisocyanate and 20 percent of 2,6-toluylene diisocyanate at 80° C for 3 hrs under agitation and thereby 608 parts of isocyanate compound having olefinic bond group (B–1) was prepared.

Then, 2,270 parts of the polybutadienediol (A–1) and 608 parts of the isocyanate compound (B–1) was mixed and heated at 80° C for 4 hrs under agitation and 2,878 parts of the resin (I) was obtained. The resin was viscous, oily and light yellowish.

According to the result of the determinations and qualitative analyses including an infrared absorption spectrum analysis, it was believed that the resin (I) has the following chemical formula:

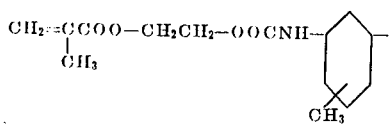

The compositions containing this resin were useful for a thermosetting resin, a coating material and an adhesive as shown in Examples 25, 26, and 27.

EXAMPLE 2

Polybutadienediol (A-2) having a number average molecular weight of 2,110, hydroxyl value of 37.6, 95.5 percent of 1,2-configuration, 4.5 percent of trans-1,4-configuration and a viscosity of 19,800 centipoise at 45° C was prepared according to the similar process as described in Example 1.

EXAMPLE 3

Three hundred and forty-eight parts of 2,4-toluylene diisocyanate was allowed to react with 172 parts of methacrylic acid for 3 hrs at room temperature and additionally for 3 hrs at 80° C under agitation with an inert atmosphere and thereby 476 parts of isocyanate compound having an olefinic bond group (B-3) was obtained.

Then, 2,950 parts of the polybutadienediol (A-2) described in Example 2 and 476 parts of the isocyanate compound (B-3) were mixed and made to react at 80° C for 4 hrs, and consequently 3,426 parts of the resin (III), which was light yellowish, viscous and oily matter, was obtained.

According to the result of determinations and qualitative analyses including an infrared absorption spectrum analysis, it was believed that the resin (III) mainly consisted of material having the following chemical formula:

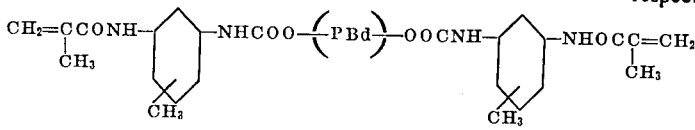

Further, the composition of the resin (III) for a thermosetting resin, a coating material and an adhesive gave satisfactory results as well as the compositions containing the resin (I).

EXAMPLE 4

Polybutadienediol (A-3) having a number average molecular weight of 1,380, hydroxyl value of 67.0, 91.2 percent of 1,2-configuration, 8.8 percent of trans-1,4-configuration and a viscosity of 11,500 centipoise at 45° C was prepared according to the similar process as described in Example 1.

On the other hand, 288 parts of 2-hydroxypropylmethacrylate was allowed to react with 500 parts of diphenylmethane-4,4'-diisocyanate for 4 hrs at 80° C under agitation and thereby 788 parts of isocyanate compound having an olefinic bond group (B-4) was obtained.

Then, 1,656 parts of the polybutadienediol (A-3) was added to 788 parts of the isocyanate compound (B-4) and the resulting mixture was heated at 80° C for 3 hrs and consequently 2,444 parts of the resin (IV), which was light yellowish, viscous and oily matter, was obtained.

According to the result of determinations and qualitative analyses including an infrared absorption spectrum analysis, it was believed that the resin (IV) mainly consisted of material having the following chemical formula:

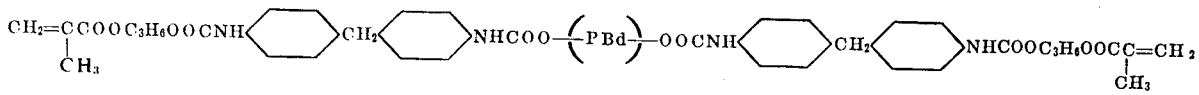

Further, the compositions containing the resin (IV) for thermosetting resin, a coating material and an adhesive respectively gave satisfactory results as well as the compositions containing the resin (I).

EXAMPLE 5

Butadiene was added into tetrahydrofuran containing a dispersed metallic sodium and 1,2-diphenyl benzene as an activator at −75° C and was polymerized under vigorous agitation. The reaction mixture was treated with carbon dioxide (dry ice) followed by hydrolysis and separation process, and thus polybutadiene dicarboxylic acid (A-4) having a number average molecular weight of 2,355, 33.6 of acid value, 90.9 percent of 1,2-configuration, 9.1 percent of trans-1,4-configuration and 39,200 centipoise of viscosity at 45° C, was obtained.

Then 3,297 parts of the polybutadiene dicarboxylic acid (A-4) was added to 608 parts of the isocyanate compound (B-1) described in Example 1 and the resulting mixture was heated at 80° C until generation of carbon dioxide gas ceased, and consequently 3,817 parts of the resin (V) which was light yellowish, viscous and oily matter, was obtained.

According to the result of determinations and qualitative analyses including an infrared absorption spectrum analysis, it was believed that the resin (V) mainly consisted of material having the following chemical formula:

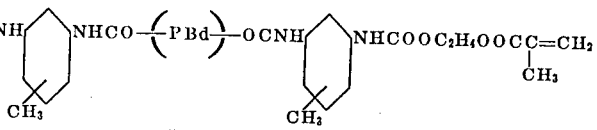

Further, the compositions containing the resin (V) for a thermosetting resin, a coating material and an adhesive respectively gave satisfactory results which were as good as the compositions containing the resin (I).

EXAMPLE 6

Four hundred and fifteen parts of triphenylmethane-4,4',4''-triisocyanate was allowed to react with 232 parts of 2-hydroxyethyl acrylate for 2 hrs at room temperature and successively for 2 hrs at 80° C, and thereby 647 parts of isocyanate compound having an olefinic bond group (B-5) was obtained.

Then, 647 parts of the isocyanate compound (B-5) was added to 1,492 parts of the polybutadienediol (A-2) described in Example 2 and the resulting mixture was heated at 80° C for 4 hrs and consequently 2,139 parts of the resin (VII) which was light yellowish, viscous and oily matter, was obtained.

The compositions containing the resin (VII) for a thermosetting resin, a coating material and an adhesive respectively gave satisfactory results as well as the compositions containing the resin (I).

EXAMPLE 7

A mixture composed of butadiene and styrene was added into tetrahydrofuran containing a dispersed metallic sodium and 1,2-diphenylbenzene as an activator at −25° C, and was polymerized under vigorous agitation. The reaction mixture was treated with an excess amount of ethylene oxide followed by hydrolysis and separation process, and thus copolybutadienediol (A–6) having a number average molecular weight of 2,250, 39.9 of hydroxyl value, 75.5 percent of butadiene unit and 24.5 percent of styrene unit in the polymeric chain, 65.8 percent of 1,2-configuration, 23.3 percent of trans-1,4-configuration, 10.9 percent of cis-1,4-configuration on the butadiene unit, was prepared.

EXAMPLE 8

Butadiene was added into tetrahydrofuran containing a dispersed metallic sodium and naphthalene as an activator at −80° C and was polymerized under vigorous agitation. The reaction mixture was treated with water, separated from water layer and tetrahydrofuran was distilled off from the mixture. Thus, unfunctional polybutadiene (A–7) having a number average molecular weight of 2,110, 91.2 percent of 1,2-configuration, 8.8 percent of trans-1,4-configuration and 6,700 centipoise of viscosity at 45° C was obtained.

2,700 parts of the polybutadiene (A–7), 1,250 parts of maleic anhydride and 5 parts of 3,5-di-tertiarylbutyl-4-hydroxy toluene were mixed and heated for 6 hrs at 160° C under nitrogen atmosphere, and then unreacted maleic anhydride was removed from the reaction mixture by reduced pressure.

The resulting polybutadiene-maleic anhydride adduct (C–7) was oily, viscous and yellowish, and introduced approximately 9.13 percent of maleic anhydride residue.

EXAMPLE 9

Butadiene was added into tetrahydrofuran containing a dispersed metallic potassium and biphenyl as an activator at −75° C and was polymerized under vigorous agitation. The reaction mixture was treated with propylene oxide followed by hydrolysis and stripping process of water and tetrahydrofuran. Thus, polybutadienediol (A–8) having a number average molecular weight of 2,760, 31.0 of hydroxyl value, 91.6 percent of 1,2-configuration, 8.4 percent of trans-1,4-configuration and 45,000 centipoise of viscosity at 45° C was prepared.

EXAMPLE 10

Polybutadienediol (A–9) having a number average molecular weight of 4,050, 21.0 of hydroxyl value, 91.5 percent of 1,2-configuration 8.5 percent of trans-1,4-configuration and 103,000 centipoises of viscosity at 45° C was prepared in accordance with the similar process as described in Example 1.

One thousand parts of the above polybutadienediol (A–9) was diluted with an equal quantity of toluene and heated to 85° C. Two hundred parts of styrene and two parts of benzoyl peroxide were added to 200 parts of toluene and this solution was mixed with the above polymer solution keeping at 85° C, and then the mixture was allowed to react for 1 hr at 85° C and successively for 1 hr at 95° C.

Unreacted styrene and solvent (toluene) were distilled off. Thus, 1,076 parts of styrene grafted copolybutadienediol (C–9) was prepared.

EXAMPLE 11

Three hundred and fifty parts of the commercial toluylene diisocyanate was added to 2,270 parts of the polybutadienediol (A–1) described in Example 1, the mixture was made to react for 1 hr at 30° C and additionally for 2 hrs at 80° C and thereby the intermediate having free isocyanato group and polybutadiene chain (B–11) was prepared.

Then, 2,620 parts of the intermediate (B–11) and 261 parts of 2-hydroxyethyl methacrylate were mixed, and the mixture was kept at 80° C for 4 hrs under agitation, and consequently 2,881 parts of the resin (XV) which was light yellowish, viscous and oily matter, was obtained.

According to the results of determinations and qualitative analyses including an infrared absorption spectrum analysis, it was believed that the resin (XV) mainly consisted of material having the following chemical formula:

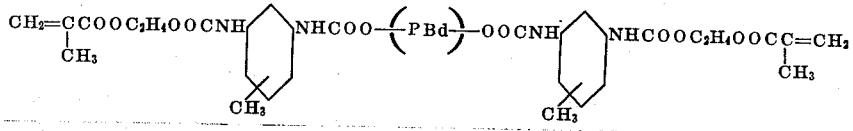

Further, the compositions containing the resin (XV) for a thermosetting resin, a coating material and an adhesive respectively gave satisfactory results as well as the compositions containing the resin (I).

EXAMPLE 12

2,620 parts of the intermediate (B–11) and 172 parts of methacrylic acid were mixed, the resulting mixture was kept at 80° C for 4 hrs under agitation and consequently 2,725 parts of the resin (XVII) was obtained.

According to the results of determinations and qualitative analyses including an infrared absorption spectrum analysis, it was believed that the resin (XVII) mainly consisted of material having the following chemical formula:

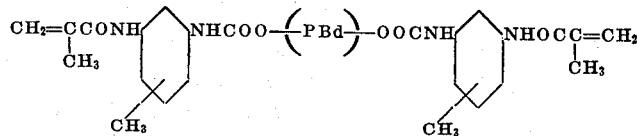

Further, the compositions containing the resin (XVII) for a thermosetting resin, a coating material and an adhesive respectively gave satisfactory results as well as the compositions containing the resin (I).

EXAMPLE 13

Five hundred parts of diphenylmethane-4,4'-diisocyanate was added to 2,770 parts of polybutadienediol (A–1) described in Example 1, the mixture was made to react for 2 hrs at 50° C and additionally for 3 hrs at 70° C in inert atmosphere under agitation and thereby the intermediate having polybutadiene chain and free isocyanato groups (B–13) was prepared.

Then, 2,770 parts of the intermediate (B–13) and 290 parts of 2-hydroxypropyl methacrylate were mixed and the mixture was kept at 80° C for 3 hrs under agitation and consequently 3,060 parts of the resin (XVIII) which was light yellowish, viscous and oily matter, was obtained.

According to the results of determinations and qualitative analyses including an infrared absorption spectrum analysis, it was believed that the resin (XVIII) mainly consisted of material having the following chemical formula:

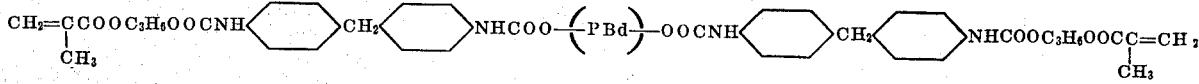

Further, the compositions containing the resin (XVIII) for a thermosetting resin, a coating material and an adhesive respectively gave satisfactory results as well as the compositions containing the resin (I).

EXAMPLE 14

Three hundred and fifty parts of the commercial toluylene diisocyanate was added to 3,300 parts of the polybutadienedicarboxylic acid (A-4) described in Example 5, the Then, 1,170 parts of the intermediate (B-18) and 72.5 parts of 2-hydroxypropyl methacrylate were mixed and the mixture was kept at 80° C for 4 hrs under agitation and consequently 1,243 parts of the resin (XXIII) which was light yellowish and oily matter, was obtained.

According to the results of determinations and qualitative analyses including an infrared absorption spectrum analysis, it was believed that the resin (XXIII) mainly consisted of material having the following chemical formula:

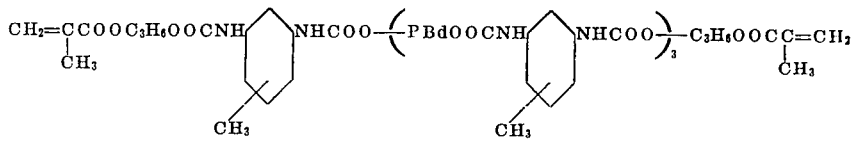

mixture was made to react for 2 hrs at room temperature and additionally for 2 hrs at 80° C in inert atmosphere under agitation until generation of carbon dioxide gas ceased, and thereby the intermediate having polybutadiene chain and free isocyanato groups (B-14) was prepared.

Then, 3,564 parts of the intermediate (B-14) and 260 parts of 2-hydroxyethylmethacrylate were mixed and the mixture was kept at 80° C for 4 hrs under agitation and consequently 3,824 parts of the resin (XIX) which was light yellowish, viscous and oily matter, was obtained.

According to the results of determinations and qualitative analyses including an infrared absorption spectrum analysis, it was believed that the resin (XIX) mainly consisted of material having the following chemical formula:

Further, the compositions containing the resin (XXIII) for a thermosetting resin, a coating material and an adhesive respectively gave satisfactory results as well as the compositions containing the resin (I).

EXAMPLE 17

For the purpose of the comparison of thermosetting resin composition, polybutadiene not having a functional group (A-11) was prepared by adding butadiene to tetrahydrofuran containing a dispersed metallic sodium and 1,2-diphenyl benzene as an activator, followed by water treatment and separation process. The resulting polybutadiene had a number average molecular weight of 4,198, 92.4 percent of 1,2-con-

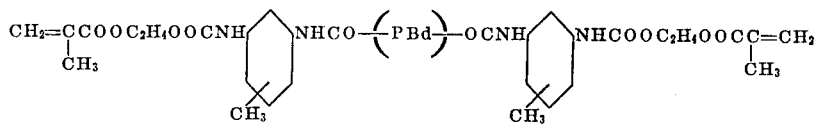

Further, the compositions containing the resin (XIX) for a thermosetting resin, a coating material and an adhesive respectively gave satisfactory results as well as the compositions containing the resin (I).

EXAMPLE 15

Four hundred and fifteen parts of triphenylmethane-4,4',4''-triisocyanate was added to 1,490 parts of the polybutadienediol (A-2) described in Example 2, the mixture was made to react for 2 hrs at room temperature and successively for 3 hrs at 80° C in inert atmosphere under agitation, and thereby the intermediate having polybutadiene chain and free isocyanato groups (B-15) was prepared.

Then, 1,905 parts of the intermediate (B-15) and 233 parts of 2-hydroxyethyl acrylate were mixed and the mixture was kept at 80° C for 4 hrs under agitation and consequently 2,138 parts of the resin (XX) which was light yellowish, viscous and oily matter, was obtained.

The compositions containing the resin (XX) for a thermosetting resin, a coating material and an adhesive respectively gave satisfactory results as well as the compositions containing the resin (I) in Example 1.

EXAMPLE 16

One hundred and seventy-five parts of the commercial toluylene diisocyanate was added to 1,000 parts of polybutadienediol (A-3) described in Example 4, the mixture was made to react for 2 hrs at 50° C and additionally for 2 hrs at 85° C in inert atmosphere under agitation, and thereby the intermediate having a polybutadiene chain and free isocyanato groups (B-18) was prepared, figuration, 7.6 percent of 1,4-configuration and 81,250 centipoise of a viscosity at 45° C.

Further, for the purpose of the comparison of the coating material composition, polybutadiene (A-12) having a number average molecular weight 3,070, 91.0 percent of 1,2-configuration, 9.0 percent of 1,4-configuration, 26,000 centipoise of viscosity at 45° C was also prepared according to the similar process as above mentioned.

Furthermore, one hundred and seventy-five parts of the commercial toluylene diisocyanate was added to 2,270 parts of polybutadienediol (A-1) and 45 parts of di-tert-butylperoxide, the mixture was allowed to react for 2 hrs at room temperature and additionally for 2 hrs at 80° C under agitation, and thereby the polyurethane resin (XXIV) was obtained.

EXAMPLE 18

Thermosetting resin compositions were prepared by mixing the resin of (I)-(XXIII) with an organic peroxide compound and a vinyl compound at the ratio indicated in Table 1 respectively and degassed in a vacuum chamber at an applied vacuum.

Control resin compositions were also prepared by mixing the polybutadiene (A-11) and the polyurethane resin (XXIV) with an organic peroxide compound and degassed.

At the end of the degassing period, each composition was poured into the mold and cured under the tabulated condition.

Hardness and flexural strength of the cured products were determined in accordance with ASTM D-2583-1966 and D-790-966 respectively and the results are expressed in Table 1.

TABLE 1

| Run | Resin | Vinyl monomer (percent) | Peroxide compound (phr.) | Temperature | Period (min.) | Crack | Appearance, transparent | Hardness Barcol | Flexural strength, kg./cm.² |
|---|---|---|---|---|---|---|---|---|---|
| 1 | I | | DCPO [1] 2 | 120 | 30 | None | LY [2] | 33 | 830 |
| 2 | I | Styrene, 30 | DTBP 0.5 | 80 | 30 | do | SY | 32 | 750 |
| 5 | III | | DCPO 2 | 125 | 60 | do | LY | 33 | 790 |
| 6 | IV | | TBPB 2 | 115 | 30 | do | LY | 28 | 700 |
| 7 | V | | DCPO 2 | 120 | 60 | do | LY | 27 | 650 |
| 9 | VII | | DCPO 1 / TBPB 1 | 110 | 60 | do | LY | 32 | 790 |

Pat. No.: 8014                                                                                              12–13

| 16 | XV | | DCPO [3] 2 / TBPB 2 | 110 | 30 | do | LY | 32 | 950 |
| 17 | XV | Styrene, 30 | TBPB 0.5 / DTBP 0.5 | 80 | 30 | do | SY | 33 | 780 |
| 20 | XVII | | DCPO 2 | 130 | 60 | do | LY | 32 | 750 |
| 21 | XVIII | | TBPB 2 | 120 | 30 | do | LY | 27 | 680 |
| 22 | XIX | | DCPO 2 | 120 | 60 | do | LY | 28 | 800 |
| 23 | XX | | TBPB 1 / DCPO 1 | 120 | 30 | do | LY | 36 | 750 |
| 26 | XXIII | Styrene, 30 | DTBP [3] 1 / BPO 1 | 80 | 30 | do | SY | 27 | 810 |
| C-1 | A-11 | | TBPB 1 / DCPO 1.5 | 150 | 300 | Yes | LY | 21 | 420 |
| C-2 | XXIV | | DTBP 2 | 120 / 130 / 150 | 600 / 180 / 120 | None | LY | 34 | 720 |

[1] DCPO=dicumyl peroxide, DTBP=di-tert-butyl peroxide, TBPB=tert-butyl perbenzoate; [2] Y=yellow, LY=light yellow; SY=slightly yellow; [3] additionally including cobalt naphthenate corresponding to 0.05 phr. of cobalt.

From the testing results in Table 1, it would be clear that the thermosetting resin compositions of this invention are possible to be set within shorter period in time and at a lower temperature than the conventional polybutadiene resin and their properties are obviously improved.

EXAMPLE 19

Coating compositions of clear varnish were prepared by mixing 70 parts of the resin (I), and (XV) respectively with cobalt naphthenate corresponding to 0.02 phr of cobalt, and 30 parts of toluene. Control composition was also prepared by the similar procedure using polybutadiene (A-11).

These clear varnishes were respectively coated on each polished steel plate with a doctor blade and coated plate was baked. Testing results of the film are presented in Table 2.

Testing method

Pencil hardness and flexibility were determined according to the methods of JIS K 5651 and JIS K 5400 respectively and the impact resistance test was carried out by one-half inch of 500 g weight.

TABLE 2

| | Run | | | | |
|---|---|---|---|---|---|
| | 27 | 28 | 30 | 31 | C-3 |
| Resin | I | I | XV | XV | A-12 |
| Peroxide compound | TBPB 2 phr | | | TBPB 2 phr | |
| Promotor | Co-N [1] | Co-N | Co-N | Co-N | Co-N |
| Film thickness (μ) | 20 | 20 | 20 | 20 | 20 |
| Curing condition: | | | | | |
| °C | 100 | 100 | 100 | 100 | 150 |
| Minutes | 30 | 20 | 40 | 20 | 30 |
| Testing result: | | | | | |
| Pencil hardness | 3H | 4H | 4H | 4H | 2B |
| Flexibility | Pass | Pass | Pass | Pass | Not pass |
| Impact resistance (Du Pont): | | | | | |
| Surface (cm.) | 50 | 50 | 50 | 50 | 30 |
| Reverse (cm.) | 50 | 50 | 50 | 50 | 10 |

[1] Co-N = Cobalt naphthenate.

From the testing results in Table 2, it would be clear that the coating composition of this invention can be cured within a shorter period of time and at a lower temperature than the conventional polybutadiene resin and properties of the resulting film are obviously improved.

EXAMPLE 20

Adhesive compositions were prepared by mixing 80 parts of the resin (I) and (XV) with 20 parts of styrene and 2 phr of dicumylperoxide homogeneously. A control composition was also manufactured by the similar procedure using polybutadiene (A-11).

The adhesive composition was placed on 2 sheets of polished steel plates, which were stuck to each other under pressure and baked. Values of tensile shear strength of the adhered plate determined in accordance with ASTM D 1002 are shown in Table 3.

TABLE 3

| Run | Resin | Vinyl monomer (percent) | Curing condition °C. | Minutes | Tensile shear strength (kg./cm.²) Initial | After aging [1] |
|---|---|---|---|---|---|---|
| 32 | I | Styrene 20 | 150 | 60 | 115 | 102 |
| 33 | XV | do | 150 | 60 | 120 | 105 |
| C-4 | A-1 | do | 150 | 60 | 78 | 60 |

[1] For 30 hrs. at 180° C.

From the above result, it would be clear that the adhesive composition of the present invention has superior adhesion to the conventional polybutadiene.

Also, from the foregoing specification it is readily apparent that the thermosetting resin herein described is particularly useful as a coating or adhesive material.

We claim:

1. A peroxide-curable thermosetting resin comprising a reaction product between
    a. polybutadiene or copolybutadiene containing not more than 50 weight percent of comonomer residue, having about 80 percent to about 100 percent of 1,2-configuration of butadiene units, substantially two functional groups of —OH or —COOH on each end of said polymeric chain, and a number average molecular weight of from 200 to 20,000; and,
    b. an isocyanate compound obtained by the reaction of an organic polyisocyanate having at least two isocyanate groups and an olefinic compound selected from the group consisting of hydroxyalkyl acrylate, hydroxyalkyl methacrylate, acrylic acid and methacrylic acid, in the stoichiometrical ratio of the polyisocyanate groups to the olefinic compound being not less than 1.1 to 2.5, wherein the stoichiometrical ratio of said isocyanate groups to said functional groups of said polybutadiene is not less than 0.5 to 1.2; whereby said peroxide-curing can be effected in a short time.

2. A mixed composition comprising the resin claimed in claim 1, wherein to said resin there is added in an amount up to 70 percent of a vinyl compound selected from the group consisting of styrene, α-methyl styrene, vinyl toluene, alkyl acrylates, alkyl methacrylates and diallyl phthalate and 0.1 to 10 percent of an organic peroxide compound.

3. A peroxide-curable thermosetting resin according to claim 1, wherein olefinic compound of hydroxyalkyl acrylate, or hydroxyalkyl methacrylate is a compound selected from the group consisting of hydroxyethyl acrylate, hydroxyethyl methacrylate, hydroxypropyl acrylate and hydroxypropyl methacrylate.

4. A peroxide curable thermosetting resin according to claim 1, wherein said polyisocyanate having at least two isocyanate groups is a compound selected from the group consisting of toluylene diisocyanate, diphenylmethane-4,4'-diisocyanate and hexamethylene diisocyanate.

5. A mixed composition according to claim 2, wherein the olefinic compound of hydroxyalkyl acrylate or hydroxyalkyl methacrylate is a compound selected from the group consisting of hydroxypropyl acrylate, hydroxyethyl methacrylate, hydroxyethyl acrylate, hydroxypropyl methacrylate.

6. A mixed composition according to claim 2, wherein the polyisocyanate having at least two isocyanate groups is a compound selected from the group consisting of toluylene diisocyanate, diphenylmethane-4,4'-diisocyanate and hexamethylene diisocyanate.

7. A mixed composition according to claim 2, wherein the organic peroxide compound is a compound selected from the group consisting of diacyl peroxides, dialkyl peroxides, alkyl perester, ketone peroxides and hydroperoxides.

8. A mixed composition according to claim 2, wherein 5–70 percent of vinyl compound is employed.

9. A mixed composition according to claim 2, wherein 0.001 to 1 percent of a heavy metal salt of an organic acid is employed together with the organic peroxide compound as a curing promoter.

10. A mixed composition according to claim 9, wherein the organic compound is alkyl perester and the heavy metal salt of an organic acid is cobalt naphthenate.

11. A peroxide-curable thermosetting resin comprising a reaction product between
a. an organic isocyanate prepolymer obtained by the reaction between polybutadiene or copolybutadiene containing not more than 50 weight percent of a comonomer residue, having about 80 percent to about 100 percent of 1,2-configuration of butadiene units, substantially two functional groups of —OH or —COOH on each end of said polymer chain, and a number average molecular weight of from 200 to 20,000; and an organic polyisocyanate having at least two isocyanate groups, the stoichiometrical ratio of isocyanate groups to said functional groups being more than 1.1 to about 2.4; and,
b. an olefinic compound selected from the group consisting of hydroxyalkyl acrylate, hydroxyalkyl methacrylate acrylic acid and methacrylic acid, wherein the ratio of said isocyanate group of said isocyanate prepolymer to the hydroxyl group of said olefinic compound is not less than 0.5 to less than 1.2; whereby said peroxide-curing can be effected in a short time.

12. A mixed composition comprising the resin claimed in claim 11, wherein to said resin there is added in amount up to 70 percent of a vinyl compound selected from the group consisting of styrene, α-methyl styrene, vinyl toluene, alkyl acrylates, alkyl methacrylates and diallyl phthalate and 0.1 to 10 percent of an organic peroxide compound.

13. A peroxide-curable thermosetting resin according to claim 11, wherein olefinic compound of hydroxyalkyl acrylate, or hydroxyalkyl methacrylate is a compound selected from the group consisting of hydroxyethyl acrylate, hydroxyethyl methacrylate, hydroxypropyl acrylate and hydroxypropyl methacrylate.

14. A peroxide-curable thermosetting resin according to claim 11, wherein said polyisocyanate having at least two isocyanate groups is a compound selected from the group consisting of toluylene diisocyanate, diphenylmethane-4,4'-diisocyanate and hexamethylene diisocyanate.

15. A mixed composition according to claim 12, wherein the olefinic compound of hydroxyalkyl acrylate or hydroxyalkyl methacrylate is a compound selected from the group consisting of hydroxypropyl acrylate, hydroxyethyl methacrylate, hydroxyethyl acrylate and hydroxypropyl methacrylate.

16. A mixed composition according to claim 12, wherein the polyisocyanate having at least two isocyanate groups is a compound selected from the group consisting of toluylene diisocyanate, diphenylmethane-4,4'-diisocyanate and hexamethylene diisocyanate.

17. A mixed composition according to claim 12, wherein the organic peroxide compound is a compound selected from the group consisting of diacyl peroxides, dialkyl peroxides, alkyl perester, ketone peroxides and hydroperoxides.

18. A mixed composition according to claim 12, wherein 5–70 percent of vinyl compound is employed.

19. A mixed composition according to claim 12, wherein 0.001 to 1 percent of a heavy metal salt of an organic acid is employed together with the organic peroxide compound as a curing promoter.

20. A mixed composition according to claim 19, wherein the organic compound is alkyl perester and the heavy metal salt of an organic acid is cobalt naphthenate.

* * * * *